United States Patent [19]

Yoshida et al.

[11] Patent Number: 5,170,415
[45] Date of Patent: Dec. 8, 1992

[54] BURST DEMODULATOR FOR ESTABLISHING CARRIER AND CLOCK TIMING FROM A SEQUENCE OF ALTERNATING SYMBOLS

[75] Inventors: Shousei Yoshida; Hizuru Nawata, both of Tokyo, Japan

[73] Assignee: NEC Corporation, Japan

[21] Appl. No.: 537,354

[22] Filed: Jun. 13, 1990

[30] Foreign Application Priority Data

Jun. 14, 1989 [JP] Japan ................... 1-152623
Jun. 14, 1989 [JP] Japan ................... 1-152624
Nov. 7, 1989 [JP] Japan ................... 1-290335
Nov. 22, 1989 [JP] Japan ................... 1-304292

[51] Int. Cl.$^5$ .................... H04L 27/14; H04L 27/22
[52] U.S. Cl. ........................... 375/80; 375/113; 329/304
[58] Field of Search ............... 375/80, 83, 97, 111, 375/81, 113; 329/304, 308; 455/214

[56] References Cited

U.S. PATENT DOCUMENTS

4,807,254  2/1989  Otani ........................ 375/97 X
4,943,982  7/1990  O'Neil, II et al. ........ 375/97 X

Primary Examiner—Curtis Kuntz
Assistant Examiner—Tesfaldet Bocure
Attorney, Agent, or Firm—Ostrolenk, Faber, Gerb & Soffen

[57] ABSTRACT

In a burst demodulator, an APSK burst signal containing a preamble of alternating "1" and "−1" symbols, followed by a data field is received and quasi-coherently demodualted into a baseband complex signal, which is converted to digital form such that each symbol of the complex signal yields N digital samples, with N being selected such that at least one of the N digital samples is closest to a signal point of the burst signal. A clock recovery circuit is responsive to the arrival of the burst for estimating the symbol timing of the burst signal from digital samples of the preamble. A digital sample is extracted from every N samples of the preamble in response to the estimated symbol timing so that it is most likely to be closest to the signal point. A carrier recovery circuit responds to the estimated symbol timing by estimating the carrier frequency and phase of the burst signal from the extracted digital samples to produce a complex carrier signal, which is multiplied with the extracted digital samples to recover the original signal. Memories are preferably provided to store the received burst signal. By repeatedly reading the preamble from the memories, the same symbols of the preamble can be used for clock timing and carrier phase recovery operations.

17 Claims, 6 Drawing Sheets

BURST DETECTOR 6
FIG. 3

BURST DEMODULATOR FOR ESTABLISHING CARRIER AND CLOCK TIMING FROM A SEQUENCE OF ALTERNATING SYMBOLS

BACKGROUND OF THE INVENTION

The present invention relates generally to digital communications systems, and more specifically to a technique for recovering carrier and clock timing for burst signal demodulation.

A synchronous detection technique has been extensively used for demodulating amplitude-phase shift keyed (APSK) signals to take advantage of its relatively high power efficiency by recovering carrier phase and clock (symbol) timing. When the signal is a burst type signal, the carrier and bit timing recovery must be accomplished in a short period of time in response to the arrival of each burst. It is the usual practice to append a preamble containing a carrier recovery sequence and a clock recovery sequence to the header of each burst. The preamble comprises a nonmodulated portion (all 1's or all −1's) for carrier recovery and a modulated portion which is a sequence of alternating 1's and −1's for clock recovery. Since the preamble adds an overhead that tends to decrease the transmission efficiency, or throughput of the digital communication system, it is desired that the length of a preamble be as short as possible.

A technique has been proposed to eliminate the need of a preamble as discussed in "Preambleless Demodulator for Satellite Communications", H. Tomita and J. Namiki, 1989, IEEE (CH2655-9/89/0000-504). According to the proposed technique, a substantial amount of information symbols is required for symbol timing and carrier recovery. To establish synchronization in as short a period of time as possible, very high-speed computation capability is required. Furthermore, at the present state of technology, the proposed system results in costly hardware implementations.

SUMMARY OF THE INVENTION

It is therefore an object of the present invention to increase the throughput of a digital communications system.

Another object of the invention is to enable the use of a preamble which comprises a single sequence of alternating 1's and −1's for both carrier phase and symbol timing recovery.

The present invention provides a burst demodulator which comprises an orthogonal detector for receiving an amplitude-phase shift keyed (APSK) burst signal containing a preamble of alternating "1" and "−1" symbols, and a data field. The detector quasi-coherently demodulates the received burst signal into a baseband complex signal, which is converted to digital form in such a way that each symbol of the complex signal yields N binary-coded digital samples, where the integer N is selected such that at least one of the N digital samples is closest to a signal point of the received burst signal. A burst detector is provided for detecting the arrival of the burst signal. A clock recovery circuit is responsive to the detection of the arrival of the burst signal for estimating the symbol timing of the burst signal from digital samples of the preamble. A digital sample is extracted from every N samples of the preamble in response to the estimated symbol timing so that the extracted sample is most likely to be closest to the signal point. A carrier recovery circuit responds to the estimated symbol timing by estimating the carrier frequency and phase of the burst signal from the extracted digital samples to produce a complex carrier signal, which is multiplied with the extracted digital samples to recover the original signal.

In a preferred embodiment, memories are provided to store the received burst signal. By repeatedly addressing the memories, clock timing and carrier phase recovery operations are performed in succession on the same symbols of the preamble.

It is preferred that the burst detector comprises a preamble generator for generating a local sequence of alternating "1" and "−1" symbols. The "1" symbol of the local sequence is multiplied with N samples of a first occurrence and the "−1" symbol of the local sequence is multiplied with N samples of a subsequent occurrence. The multiplied samples are split into a sequence of odd-numbered samples and a sequence of even-numbered samples and low-pass filtered. A first absolute value of the lowpass-filtered odd-numbered samples and a second absolute value of the lowpass-filtered even-numbered samples are determined and respectively lowpass filtered. A combined absolute value of the lowpass filtered odd- and even-numbered samples is determined and compared with a predetermined threshold value. If it exceeds the threshold value, a signal indicating the arrival of a burst signal is generated.

BRIEF DESCRIPTION OF THE DRAWINGS

The present invention will be described in further detail with reference to the accompanying drawings, in which.

DETAILED DESCRIPTION

Figures 1, 2:
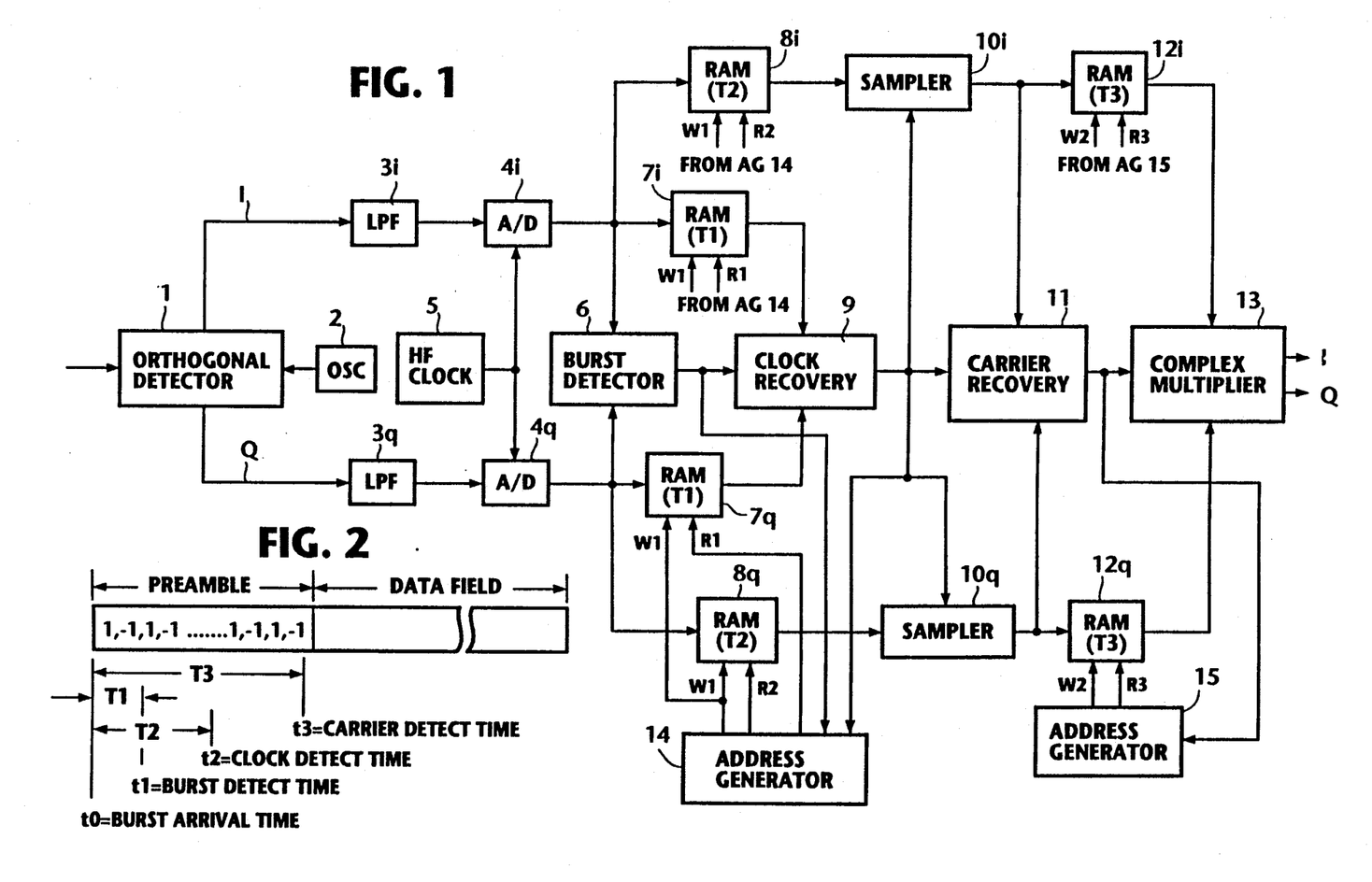
FIG. 1 is a block diagram of an APSK burst demodulator according to a first embodiment of the present invention.
FIG. 2 is a timing diagram showing read times of the random access memories of FIG. 1 with respect to the preamble of a received burst signal.

Referring now to FIG. 1, there is shown an APSK (amplitude-phase shift keyed) burst demodulator. The demodulator comprises an orthogonal detector 1 of conventional design for receiving APSK burst signals from a transmitter. Each burst signal contains a preamble having a sequence of alternating symbols 1 and −1, followed by a data field as shown in FIG. 2. Orthogonal detector 1 is supplied with quadrature carriers from a local oscillator 2 and detects the in-phase and quadrature components at baseband frequencies from the received burst. Since the local oscillator 2 is not synchronized with the carrier phase of the received burst, the detection in this manner is in a 'quasi-coherent mode', i.e., the incoming signal is 'coarsely' demodulated. Therefore, the quasi-demodulated baseband signals contain a phase difference between the local and transmitted carriers and this phase difference will be compensated for at a later stage.

The in-phase and quadrature components are supplied respectively on an l-channel path and Q-channel path to low-pass filters 3*i* and 3*q* to remove their high frequency components in order to restrict the baseband signals below the Nyquist frequency. The outputs of LPF 3*i* and 3*q* are respectively fed to A/D converters 4*i* and 4*q* and sampled in response to a pulse supplied from a high-frequency clock generator 5 at an integral multiple (N) of the original sampling rate so that each incoming symbol yields N analog samples. Each of the N analog samples is converted into an n-bit digital sample of complex value. The integer N is so selected that at least one of the N samples is closest to a signal point. The output of A/D converter 4*i* is supplied to one input of a burst detector 6 as well as to random access memories 7*i* and 8*i*, and the output of A/D converter 4*q* is supplied to the other input of burst detector 6 as well as to random access memories 7*q* and 8*q*. The read/write operations of random access memories 7*i*, 7*q*, 8*i* and 8*q* are controlled by an address generator 14. Each of these RAMs is of dual port type which allows simultaneous write and read operations. Address generator 14 continuously supplies a sequence of write addresses W1 to RAMs 7*i*, 7*q*, 8*i* and 8*q* to store digital samples from the A/D converters. Address generator 14 generates two sequences of read address signals R1 and R2 for reading RAMs 7*i*, 7*q* and RAMs 8*i* and 8*q*, respectively. In response to the output of burst detector 6 which may occur at time $t_1$, address generator 14 resets its read address signal R1 to an initial address count which is equal to the current write address minus a prescribed address count which corresponds to a delay time $T_1$. This prescribed address count is so determined that read operation may begin with symbols which were stored in RAMs 7*i*, 7*q* at burst arrival time $t_0$. In this way, RAMs 7*i* and 7*q* delay the preamble by time period $T_1$ with respect to the burst arrival time $t_0$.

The $T_1$-delayed samples of the preamble from RAMs 7*i* and 7*q* are fed to respective inputs of a clock recovery circuit 9 to which the output of burst detector 6 is also applied. Thus, clock recovery circuit 9 is now able to perform a clock recovery operation beginning with the first symbol of the preamble. On establishing clock synchronization, clock recovery circuit 9 generates a sequence of clock pulses which are fed as sampling pulses to samplers 10*i* and 10*q* to which the outputs of RAMs 8*i* and 8*q* are respectively applied when the eye opening of the incoming signal is at the largest.

Address generator 14 is further responsive to the clock pulse of first occurrence, which may be supplied from clock recovery circuit 9 at time $t_2$, to reset its second read address signal R2 to an initial address count which is equal to the current write address minus a prescribed address count which corresponds to a delay time $T_2$ from burst arrival time $t_0$. This prescribed address count is also so determined that the read operation with address sequence R2 may begin with symbols which were stored in RAMs 8*i*, 8*q* at burst arrival time $t_0$. In this way, RAMs 8*i* and 8*q* delay the preamble by time period $T_2$ with respect to the burst arrival time $t_0$.

The $T_2$-delayed symbols of the preamble from RAMs 8*i* and 8*q* are respectively sampled by samplers 10*i* and 10*q* in response to the sampling pulse from clock recovery circuit 9 so that in each of these samplers a most likelihood sample is chosen from every N samples.

The outputs of samplers 10*i* and 10*q* are fed to respective inputs of a carrier recovery circuit 11 as well as to RAMs 12*i* and 12*q*, respectively. The read/write operations of RAMs 12*i* and 12*q* are controlled by an address generator 15 which, in a manner similar to address generator 14, continuously supplies a sequence of write addresses W2 to RAMs 12*i* and 12*q* to store the outputs of samplers 10*i* and 10*q*. Address generator 15 responds to the output of carrier recovery circuit 11, which may occur at time $t_3$, by resetting a sequence of read addresses R3 to an address count which is equal to the current write address W2 minus a prescribed address count which corresponds to a delay time $T_3$. This prescribed address count is so determined that read operation of RAMs 12*i*, 12*q* may begin with symbols which were stored in these RAMs at burst arrival time $t_0$.

In this way, RAMs 12*i* and 12*q* delay the preamble by time period $T_3$ with respect to the burst arrival time $t_0$ and carrier recovery operation is effected on the same sequence of alternating "1" and "−1" symbols of the preamble as those on which the burst detection and clock recovery operations were performed. The outputs of RAMs 12*i* and 12*q* are fed to respective inputs of a product demodulator, or complex multiplier 13. Carrier recovery circuit 11 responds to the output of clock recovery circuit 9 indicating the recovery of a clock by starting a carrier recovery operation in which it estimates the carrier frequency and phase from the outputs of samplers 10*i* and 10*q* and supplies a carrier frequency and phase output in complex value to complex multiplier 13. In multiplier 13, it is used to coherently demodulate delayed digital samples from RAMs 12*i*, 12*q* to generate a replica of the original l-channel and Q-channel signals.

It is seen that the same preamble of alternating "1" and "0" bit sequence is successively delayed for use in burst detection, clock recovery and carrier recovery operations, thus allowing the system to establish carrier and clock synchronization with a short-length preamble.

Details of burst detector 6, clock recovery circuit 9 and carrier recovery circuit 11 will now be described with reference to FIGS. 3 to 7.

Figures 3, 4:
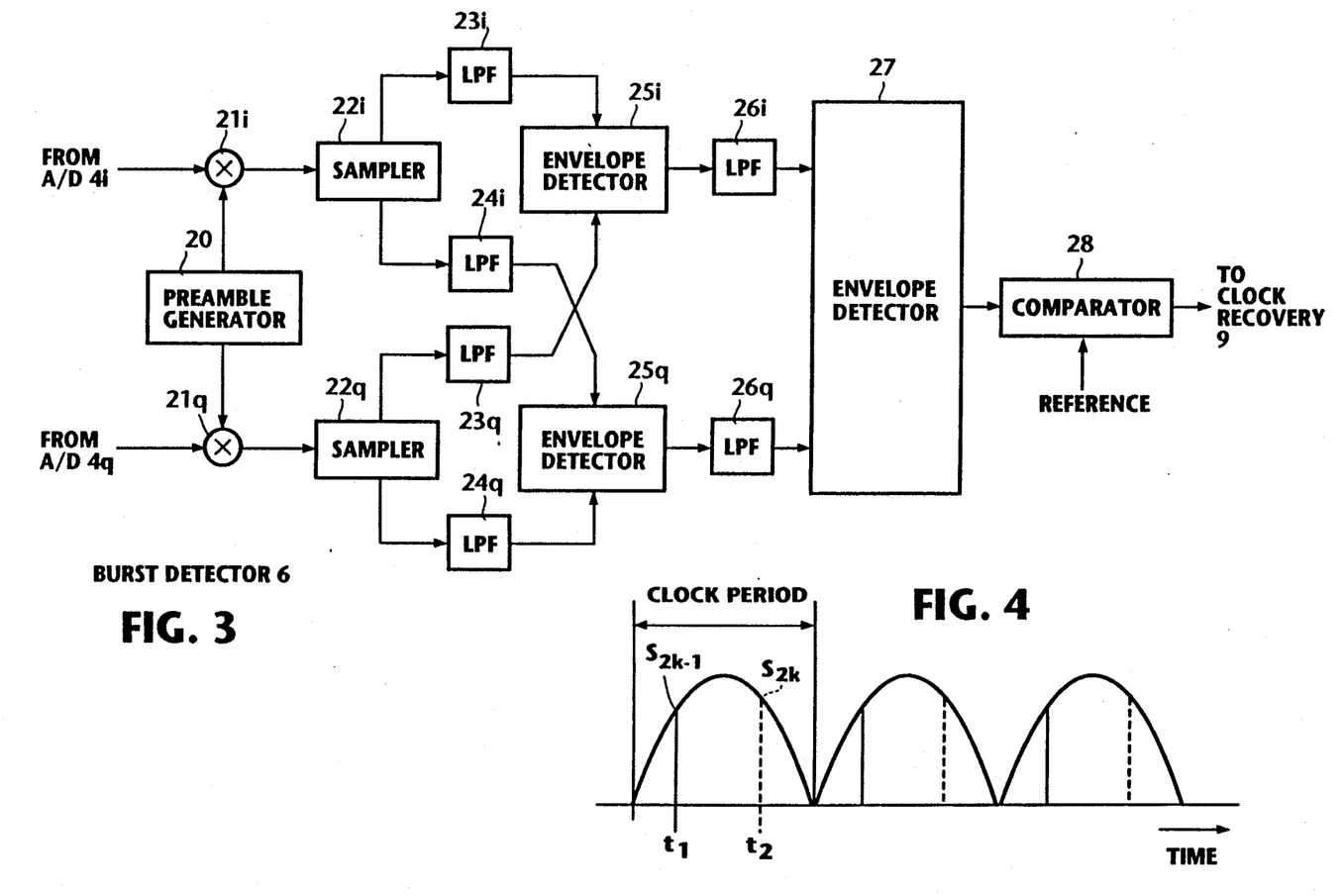
FIG. 3 is a block diagram of the burst detector of FIG. 1.
FIG. 4 is a waveform diagram associated with the burst detector.

In FIG. 3, burst detector 6 is shown as comprising a preamble generator 20 which generates a sequence of alternating values "1" and "−1" at 1/N of the original sampling rate and supplies it to multipliers 21*i* and 21*q* to which the outputs of A/D converters 4*i* and 4*q* are respectively applied. Thus, every N digital samples of the received preamble are multiplied with "1" or "−1" by multipliers 21*i* and 21*q* to produce a sequence of samples with a value "1". If the phase timing precisely matches the incoming signal, all samples of the preamble will be transformed to values "1" so that the outputs of multipliers 41*i* and 41*q* appear as if the carrier were unmodulated during the preamble. In this case, the modulating signal is substantially removed from the preamble, extracting the carrier components at the outputs of multipliers 21*i* and 21*q* for enabling the burst to be detected.

Since the preamble generator 20 is not synchronized with the incoming signal, all samples of a preamble are not necessarily converted to all 1's. The outputs of multipliers 21*i* and 21*q* are supplied to samplers 22*i* and 22*q*, respectively. Each sequence of N samples from multiplier 21*i* is sampled by sampler 22*i* at twice the original sampling rate (or 2/N of the clock rate of generator 5) to yield two output samples from every N input samples. One of these samples is supplied as a sequence of odd-numbered samples $S_{2k-1}$ or sine signals to a low-pass filter 23i and the other is supplied as a sequence $S_{2k}$ of even-numbered samples of cosine signals to a low-pass filter 24i (where k=1, 2, 3 . . . ). Likewise, every N samples from multiplier 21q is sampled at twice the original sampling rate by sampler 22q to extract two samples from every N samples and one of which is applied to a low-pass filter 23q as an odd-numbered sample and the other of which is applied to a low-pass filter 24q as an even-numbered sample.

The effect of low-pass filters 23i, 24i, 23q and 24q is to remove high-frequency noise components of the sampled sequences. The outputs of low-pass filters 23i and 24q are coupled to envelope detectors 25i and 25q, respectively, and the outputs of low-pass filter 24i and 23q are cross-coupled to envelope detectors 25q and 25i, respectively. Each of these envelope detectors 25i and 25q produces an output representative of the absolute value of the inputs. Since the input signals are of complex signals, each envelope detector calculates $$\sqrt{(S_{2k-1})^2 + (S_{2k})^2},$$

the or square root of the sum of the squared real and imaginary components. The outputs of envelope detectors 25i and 25q, if represented by analog form, would appear as a sequence of half-wave pulses of "quasi-sinusoid" as shown in FIG. 4 due to the rolloff characteristics of the low-pass filters 3i and 3q. Each of these half-wave pulses arises from components $S_{2k-1}$ and $S_{2k}$ sampled at times $t_1$ and $t_2$. The variance of the outputs of envelope detectors 25i and 25q is then reduced by low-pass filter 26i and 26q, whose outputs are coupled to an envelope detector 27 which calculates the root-sum-square value of its input samples.

Since the outputs of envelope detectors 25i and 25q are of quasi-sinusoid of half-period waveform, the sampled data $S_{2k-1}$ and $S_{2k}$ can be considered as orthogonal to each other, and hence, the calculation of the root-sum-square value of these signals by envelope detector 27 results in the generation of a large amplitude envelope comparable to one which would be derived from the transmitted signal point. In addition, each of the values of envelopes $S_{2k-1}$ and $S_{2k}$ is not necessarily at maximum due to the phase difference between the locally generated preamble and the received one. Thus, when envelope detector 25i produces a maximum amplitude output, the other detector 25q would produce a minimum amplitude output. Therefore, the splitting of the carrier component by samplers 22i and 22q into sine and cosine components and the root-sum-square calculation of envelope detector 27 can result in a constant amplitude output, compensating for the phase difference between the received preamble and the one produced by local preamble generator 20.

A comparator 28 is coupled to the output of envelope detector 27. If the output of envelope detector 27 exceeds a reference value, comparator 28 generates an output signal indicating the arrival of a burst. It is to be noted that in an alternative embodiment each of the envelope detectors 25i, 25q and 27 provide calculation of the sum of squares, instead of the root-sum-square calculation.

Figure 5:
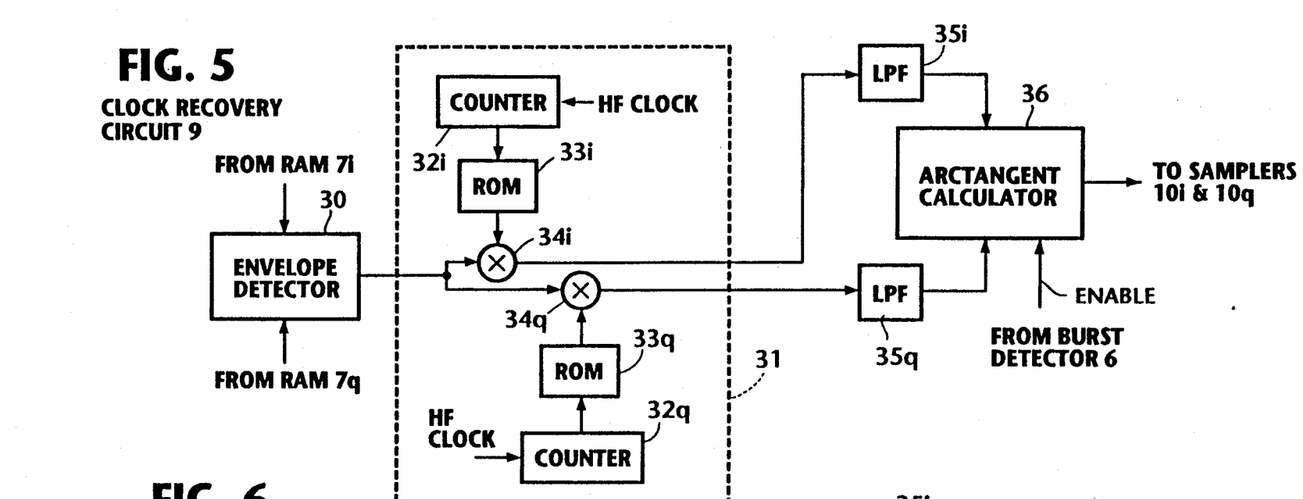
FIG. 5 is a block diagram of an example of the clock recovery circuit of FIG. 1.

As shown in FIG. 5, clock recovery circuit 9 is made up of an envelope detector 30, an orthogonal detector 31, low-pass filters 35i, 35q and an arctangent calculator 36. Envelope detector 30 calculates the root-sum-square value of the outputs of RAM 7i and 7q and applies a complex output signal to orthogonal detector 31. Orthogonal detector 31 comprises a read-only memory 33i which stores data indicating the products of phase values of a sinusoid and input sine components which will be generated by envelope detector 30 and a read-only memory 33q which stores data indicating the products of phase values of a cosinusoid and input cosine components. ROM's 32i and 32q are respectively driven by counters 32i and 32q which are clocked at a high frequency rate. The complex signal from envelope detector 30 is applied to multiplers 34i and 34q and multiplied with the outputs of ROMs 33i and 33q. The outputs of multipliers 34i and 34q are supplied to low-pass filters 35i and 35q, respectively, as orthogonally detected signals.

Arctangent calculator 36 is enabled in response to the output of burst detector 6 to calculate the arctangent of the outputs of low-pass filters 35i and 35q to produce a signal indicating the phase angle, or clock timing of the symbols contained in the preamble. The output of arctangent calculator 36 is thus caused to appear when the eye opening of the incoming signal is at the largest, and applied as a sampling pulse to samplers 10i and 10q, so that a digital sample extracted by each of these samplers is one that is closest to the transmitted signal point.

Figure 6:
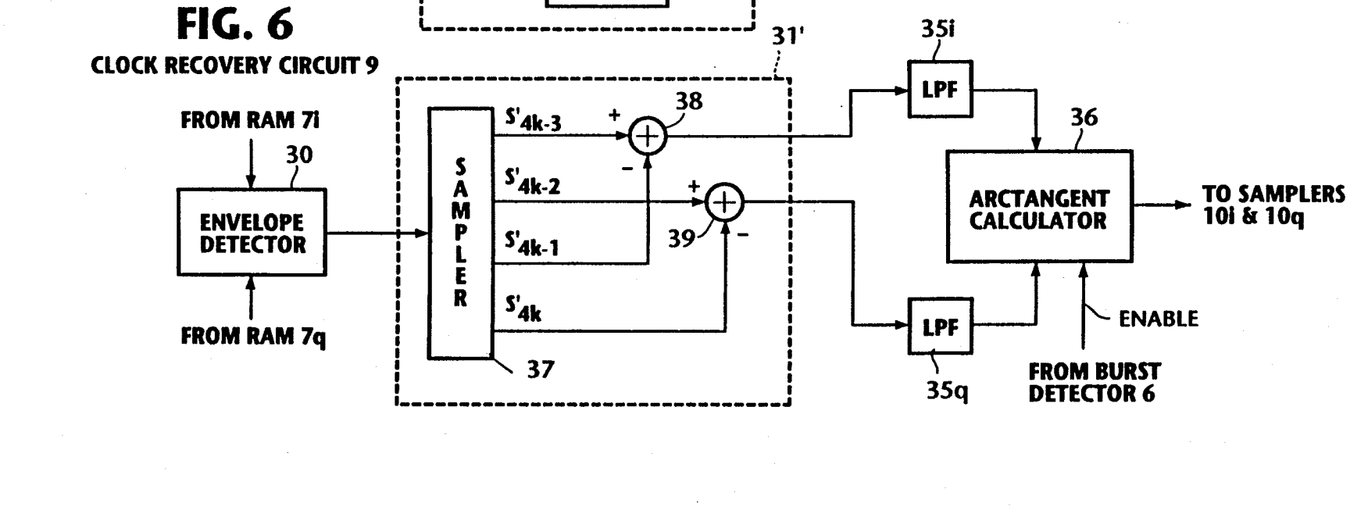
FIG. 6 is a block diagram of a preferred clock recovery circuit.

In FIG. 6, a preferred form of the orthogonal detector is shown at 31' as comprising a sampler 37 and subtractors 38 and 39. Sampler 37 provides sampling on every N input samples at four times the original sampling rate to extract four samples from every N input samples and split them into successive sample sequences $S'_{4k-3}$, $S'_{4k-2}$, $S'_{4k-1}$ and $S'_{4k}$. Since the output of envelope detector 30 contains the modulating component of quasi-sinusoid, samples $S'_{4k-3}$ and $S'_{4k-2}$ can be regarded as quasi-demodulated complex signals, while samples $S'_{4k-1}$ and $S'_{4k}$ can be regarded as DC and harmonics components which result if the bandlimiting of low-pass filters 3i and 3q is not sufficient. To remove these undesired components, samples $S'_{4k-1}$ and $S'_{4k}$ are subtracted from samples $S'_{4k-3}$ and $S'_{4k-2}$ by subtractors 38 and 39 to produce outputs for coupling to low-pass filters 35i and 35q, respectively.

Figure 7:
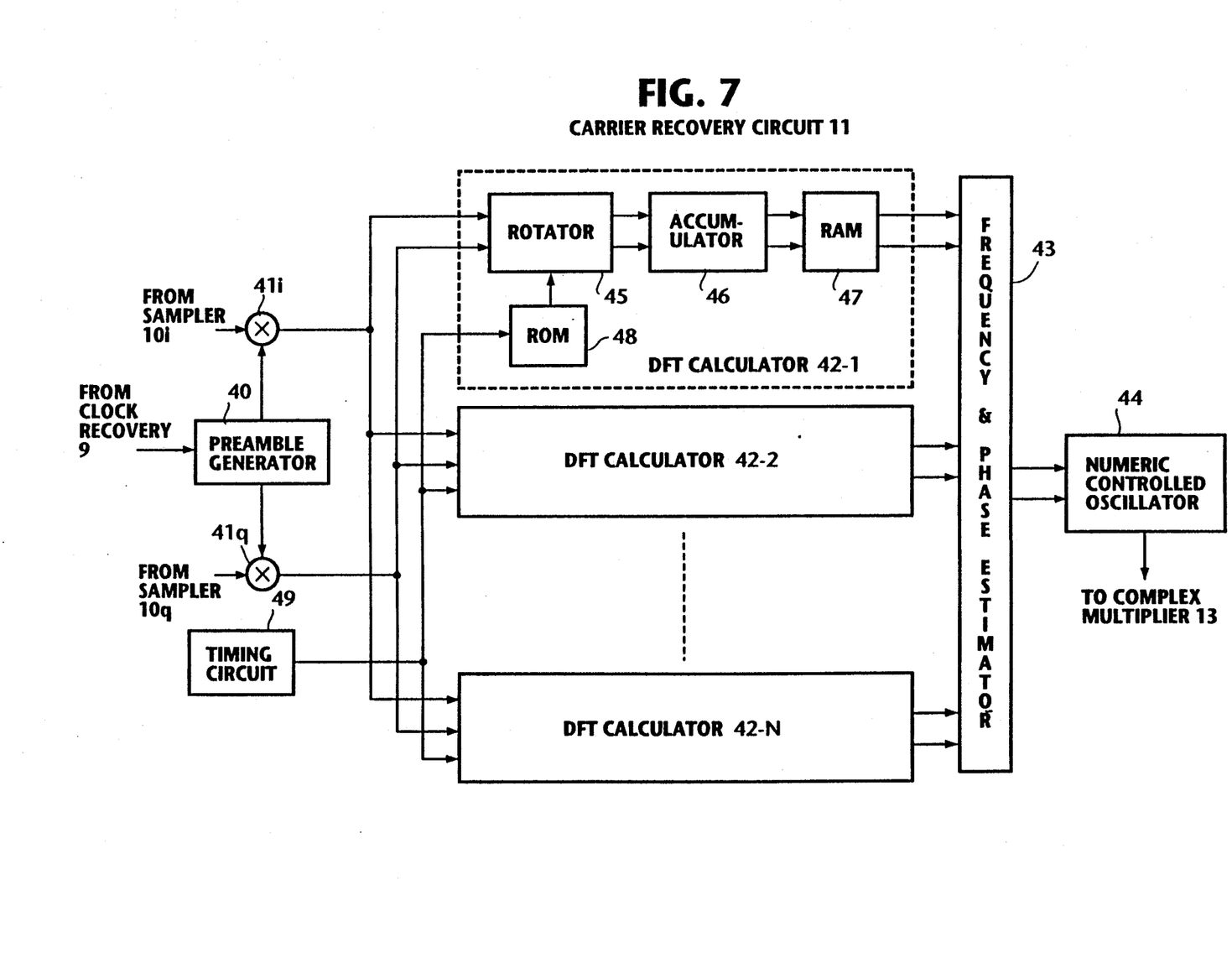
FIG. 7 is a block diagram of the carrier recovery circuit of FIG. 1.

FIG. 7 shows details of the carrier recovery circuit 11 of FIG. 1. As illustrated, carrier recovery circuit 11 includes a preamble generator 40, multipliers 41i and 41q, DFT (discrete Fourier tranform) calculators 42-1 through 42-N, a frequency/phase estimator 43, and a numeric controlled oscillator 44.

Multipliers 41i and 41q extract carrier components from the outputs of samplers 10i and 10q. Preamble generator 40 is responsive to the output of clock recovery circuit 9 to supply a value "1" to multipliers 41i and 41q for multiplication with samples "1" of the preamble extracted by samplers 10i and 10q and is responsive to the next clock input to supply a value "−1" to multiply it with samples "−1". In this way, quadrature carrier components completely free of modulating components are available at the outputs of multipliers 41i and 41q. A plurality of DFT (discrete Fourier transform) calculators 42-1 to 42-N are provided. Each DFT calculator includes a rotator 45, an accumulator 46, a RAM 47 and a ROM 48. The multipliers 41i and 41q are coupled to the rotator 45 of each DFT calculator 42 where their outputs of complex value are multiplied with phase angle values supplied from ROM 48 in response to a timing signal from a timing circuit 49. The outputs of rotator 45 are fed to accumulator 46 to calculate the following equations:

$$F_k = \sum_{n=0}^{(N/2)-1} X_n \cdot \exp\left(-j2\pi \frac{0.5K \cdot n}{N}\right)$$

$$B_k = \sum_{n=N/2}^{N-1} X_n \cdot \exp\left(-j2\pi \frac{0.5K \cdot n}{N}\right)$$

where $X_n$ represents the input samples from rotator 45.

The outputs of accumultor 46 are stored in RAM 47 and thence to frequency/phase estimator 43. Estimator 43 first determines the absolute value of $F_k + B_k$ and then determines k which maximizes the absolute value, and finally determines frequency f and phase $\theta$ by calculating the following equations:

$$f = 0.5 f_k + \frac{1}{\pi}(\text{Arg}(F_k) - \text{Arg}(B_k))$$

$$\theta = 0.5(\text{Arg}(F_k) - \text{Arg}(B_k))$$

The frequency and phase outputs of estimator 43 are supplied to numeric controlled oscillator 44 to generate a replica of the transmitted carrier for coupling to the complex multiplier 13.

Carrier recovery circuit 11 of the type described above is particularly suitable if the incoming burst is of a short duration containing as small as a few hundreds symbols. However, a carrier phase error occurs due to inherent frequency estimation error caused by carrier recovery circuit 11 at the beginning of a burst. While it can be tolerated for short duration bursts, the initial phase error increases as demodulation proceeds toward the end of the burst, leading to an unfavorable situation in the case of long duration bursts.

Figure 8:
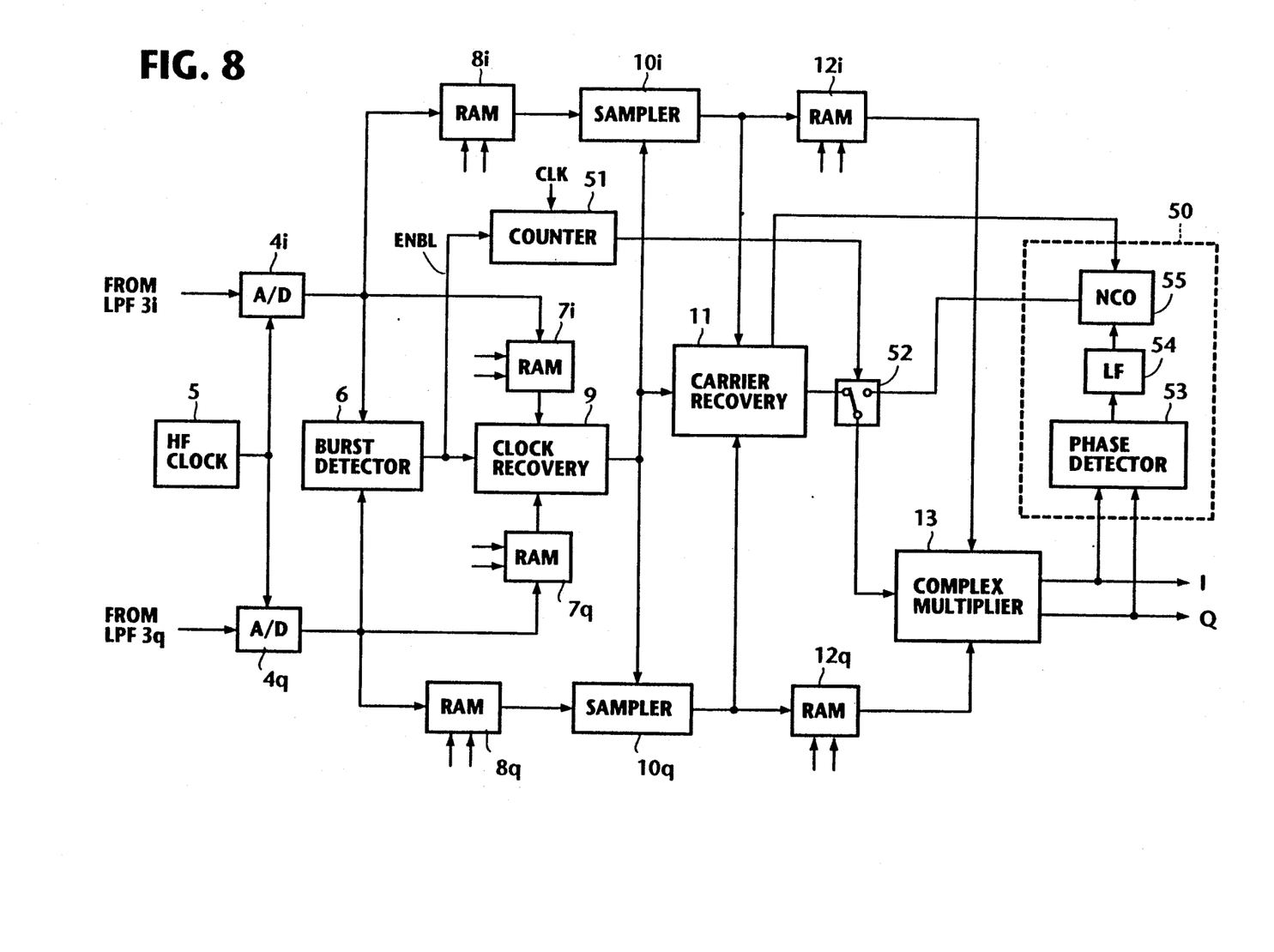
FIG. 8 is a block diagram of a second embodiment of this invention.

FIG. 8 shows a second embodiment of the present invention which is suitable for demodulators handling burst signals containing a long data field or a variable length packet. In this embodiment, the burst demodulator additionally includes a second carrier recovery circuit 50 of a phase-locked loop type which differs from the first carrier recovery circuit 11 in that it maintains synchronization indefinitely after its has been established by continuously tracking the carrier phase. A counter 51 is connected to the output of burst detector 6 to start counting internal clock and feeds a switching pulse to a switch 52 when a prescribed amount of time has elapsed following the detection of a burst signal. Switch 52 is initially positioned to the left for coupling the output of the first carrier recovery circuit 11 to complex multiplier 13.

As illustrated the second carrier recovery circuit 50 comprises a phase detector 53 coupled to the outputs of complex multiplier 13, a loop filter 54 which applies the output of phase detector 53 to a numeric controlled oscillator 55. Numeric controlled oscillator 55 is also supplied with a signal indicating the frequency and initial phase values of the burst signal estimated by the first carrier recovery circuit 11 to continuously generate a complex carrier signal. In response to a switching pulse, the transfer contact of switch 52 is moved to the right, and the carrier recovered by the second carrier recovery circuit 50 is fed to complex multiplier 13. In this way, a phase-locked loop is formed by carrier recovery circuit 50 and complex multiplier 13 to maintain the phase-locked carrier generation.

Figure 9:
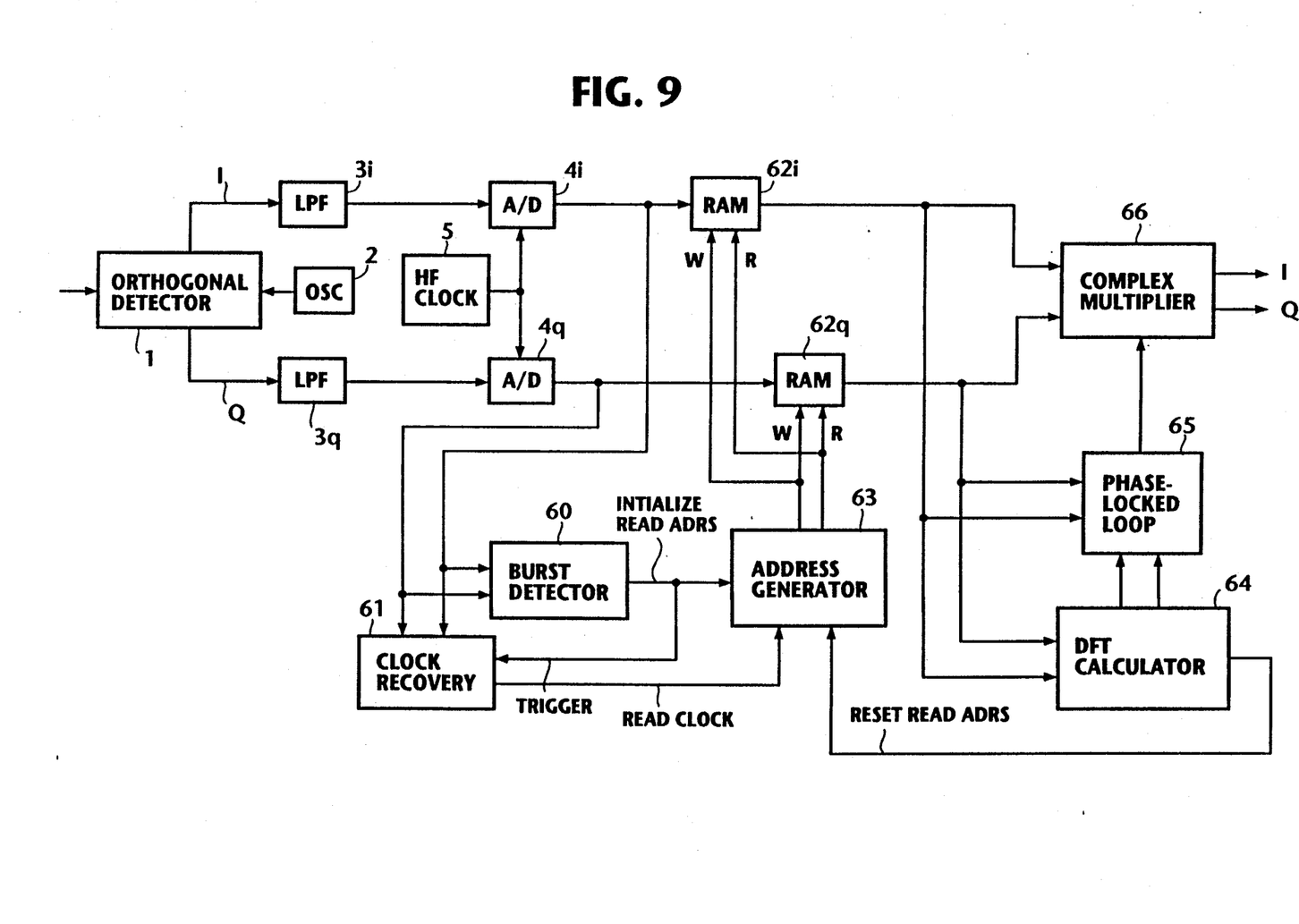
FIG. 9 is a block diagram of a third embodiment of this invention.

FIG. 9 shows a third embodiment of the present invention in which parts corresponding to those in the previous embodiments are marked by the same numerals as used therein. A burst detector 60 of the type identical to that shown in FIG. 3 and a clock recovery circuit 61 of the type shown in FIG. 5 are connected to the outputs of A/D converters 4i, 4q, and random access memories 62i and 62q of dual port type are connected respectively to the outputs of A/D converters 4i and 4q. An address generator 63 constantly supplies a write address to RAMs 62i, 62q to store digital samples from A/D converters 4i, 4q. Upon detection of a burst at time $t_1$, burst detector 60 supplies a signal to address generator 63 to cause it to initialize its read address which is displaced by a predetermined amount of address counts from the current write address, so that the initial read address can access the locations of RAMs 62i, 62q in which the digital samples at the beginning of a preamble are stored. Clock recovery circuit 61 is triggered in response to the output of burst detector 60 to start hunting clock timing. Clock pulses are generated by clock recovery circuit 61 and supplied to address generator 63 to cause it to successivley increment its read address. Therefore, digital samples of the preamble are read out of RAMs 62i and 62q at the instant at which the eye opening of the incoming signal is at the largest. The samples read out of memories 62i and 62q are supplied to a DFT calculator 64 and a phase-locked loop 65 which forms a carrier recovery circuit with DFT calculator 64. The latter performs a discrete Fourier transform on every N samples from the memories 62i, 62q and estimates the frequency and initial phase of the residual carrier of the received burst signal.

On completion of a DFT calculation at time $t_2$, calculator 64 supplies signals indicating the estimated carrier frequency and phase to phase-locked loop 65 to initialize its parameters to allow it to subsequently generate a carrier signal of complex value. Simultaneously, DFT calculator 64 supplies a signal to address generator 63 to reset its read address to the initial value. Therefore, digital samples of the preamble are again read out of memories 62i and 62q and supplied to a complex multiplier 66 as well as to phase-locked loop 65. In the phase-locked loop 65, it is used to continuously generate the complex carrier signal having the estimated frequency and phase and applies it to complex multiplier 66 to precisely detect the digital samples to recover a replica of the original I-channel and Q-channel signals. After the first DFT calculation, calculator 64 no longer supplies a reset signal to address generator 63 to allow it to simply perform write and read operations for data field that follows.

The burst demodulator of this invention can be advantageously implemented by using digital signal processing techniques.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A burst demodulator comprising:

orthogonal detector means for receiving an amplitude-phase shift keyed (APSK) burst signal having a carrier frequency and a phase associated therewith and containing a preamble formed by a sequence of alternating "1" and "−1" symbols, and a data field, and for quasi-coherently demodulating the received burst signal into a baseband complex signal;

analog-to-digital (A/D) converter means for converting the baseband complex signal to digital form so that each symbol of the complex signal yields N binary-coded digital samples, the integer N being such that at least one of the N digital samples is closest to a signal point of the received burst signal;

burst detector means for detecting the arrival of said burst signal from digital symbols derived by said A/D converter means from said preamble;

clock recovery means responsive to the detection of the arrival of said burst signal by said burst detector means for estimating the symbol timing of the burst signal from digital samples derived by said A/D converter means from the symbols of said preamble;

sampler means for extracting a digital sample from every N binary-coded digital samples derived by said A/D converter means from the symbols of said preamble in response to the estimated symbol timing so that the extracted digital sample is substantially likely to be closest to the signal point;

carrier recovery means responsive to the symbol timing estimated by said clock recovery means for estimating the carrier frequency and the phase of said burst signal from the digital samples extracted by said sampler means to produce a complex carrier signal; and complex multiplier means for multiplying the complex carrier signal with the digital samples extracted by said sampler means and for producing an output representative of said multiplication.

2. A burst demodulator as claimed in claim 1, wherein said sampler means comprises memory means connected to said A/D converter means; and address generator means for storing digital samples from said A/D converter means into said memory means and reading digital samples from said memory means, said address generator means being responsive to the detection of the arrival of said burst signal for addressing initial locations of said memory means in which samples were stored at the instant said burst signal is arrived, said address generator means being further responsive to the clock timing detected by the clock recovery means for successively reading digital samples from said memory means starting with locations substantially equal to said initial locations.

3. A burst demodulator as claimed in claim 2, wherein said address generator is further responsive to an output signal from said carrier recovery means for successively reading digital samples from said memory means starting with locations substantially equal to said initial locations.

4. A burst demodulator as claimed in claim 1, wherein said carrier recovery means comprises:

preamble generator means for generating a local sequence of alternating "1" and "−1" symbols in response to the clock timing estimated by said clock recovery means;

multiplier means for multiplying said "1" symbol of said local sequence with N samples of first occurrence from said A/D converter means and multiplying said "−1" symbol of said local sequence with N samples of subsequent occurrence from said A/D converter means to produce an output sequence; and means for estimating said carrier frequency and an initial phase of the burst signal from said output sequence 5. A burst demodulator as claimed in claim 1, wherein said burst detector means comprises:

preamble generator means for generating a local sequence of alternating "1" and "−1" symbols;

multiplier means for multiplying said "1" symbol of said local sequence with N samples of first occurrence from said A/D converter means and multiplying said "−1" symbol of said local sequence with N samples of subsequent occurrence from said A/D converter means to produce an output sequence;

sampler means for splitting said output sequence of said multiplier means into a sequence of odd-numbered samples and a sequence of even numbered samples;

first low-pass filter means for low-pass filtering said odd-numbered samples;

second low-pass filter means for low-pass filtering said even-numbered samples;

first envelope detector means for detecting a root-sum-square value of an output signal of said first low-pass filter means;

second envelope detector means for detecting a root-sum-square value of an output signal of said second low-pass filter means;

third low-pass filter means for low-pass filtering an output signal of said first envelope detector means;

fourth low-pass filter means for low-pass filtering an output signal of said second envelope detector means;

third envelope detector means for detecting a combined root-sum-square value of output signals of said third and fourth low-pass filter means; and comparator means for detecting when said combined root-sum-square value exceeds a predetermined threshold value to generate a signal indicating the arrival of a burst signal.

6. A burst demodulator as claimed in claim 1, wherein said clock recovery means comprises:

envelope detector means for detecting a root-sum-square value of the digital samples from said A/D converter means;

orthogonal detector means for generating products of said root-sum-square value and phase values of a sine wave and products of said root-sum-square value and phase values of a cosine wave;

low-pass filter means for low-pass filtering said products and generating estimated symbol timing; and arctangent calculator means for detecting the phase angle of estimated symbol timing from the low-pass filtered products in response to the detection of arrival of a burst signal by said burst detector means.

7. A burst demodulator as claimed in claim 1, wherein said clock recovery means comprises:

envelope detector means for detecting a root-sum-square value of the digital samples from said A/D converter means;

sampler means for splitting an output signal of said envelope detector means into first, second, third and fourth sequences of samples;

first subtractor means for subtracting said third sequence from said first sequence and second subtractor means for subtracting said fourth sequence from said second sequence;

first and second low-pass filter means for low-pass filtering outputs of said first and second subtractor means, respectively; and arctangent calculator means for detecting the phase angle of said estimated symbol timing from outputs of the first and second low-pass filter means in response to the detection of arrival of a burst signal by said burst detector means.

8. A burst demodulator as claimed in claim 1, wherein said carrier recovery means comprises:

preamble generator means for generating a local sequence of alternating "1" and "−1" symbols in response to the clock timing estimated by said clock recovery means;

multiplier means for alternately multiplying said "1" and "−1" symbols of said local sequence with successive samples from said A/D converter means to extract the carrier component of said received burst signal;

complex Fourier transform means for transforming the extracted carrier component to a frequency domain complex signal;

frequency and phase estimating means for estimating the frequency and phase of a carrier to be recovered from the frequency domain complex signal; and numeric controlled oscillator means for generating a carrier in response to the estimated frequency and phase.

9. A burst demodulator comprising:

orthogonal detector means for receiving an amplitude-phase shift keyed (APSK) burst signal having a carrier frequency and a phase associated therewith and containing a preamble formed by a sequence of alternating "1" and "−1" symbols and a data field, and for quasi-coherently demodulating the received burst signal into a baseband complex signal;

analog-to-digital (A/D) converter means for converting the baseband complex signal to digital form so that each symbol of the complex signal yields N binary-coded digital samples, the integer N being such that at least one of the N digital samples is closest to a signal point of the received burst signal;

burst detector means for detecting the arrival of said burst signal derived by said A/D converter means from said preamble;

memory means coupled to said A/D converter means;

clock recovery means responsive to the detection of the arrival of said burst signal by said burst detector means for receiving digital samples from said memory means and estimating the symbol timing of the burst signal from the received digital samples;

sampler means responsive to the symbol timing estimated by said clock recovery means for receiving digital samples from said memory means and extracting a digital sample from every N samples of the received digital samples so that the extracted digital sample is most likely to be closest to the signal point;

carrier recovery means responsive to the symbol timing estimated by said clock recovery means for estimating the carrier frequency and the initial phase of said burst signal from a plurality of digital samples extracted by said sampler means to produce a complex carrier signal; and complex multiplier means for multiplying the complex carrier signal with the digital samples extracted by said sampler means and for producing an output representative of said multiplication.

10. A burst demodulator as claimed in claim 9, wherein said carrier recovery means comprises:

preamble generator means for generating a local sequence of alternating "1" and "−1" symbols in response to the clock timing estimated by said clock recovery means:

multiplier means for multiplying said "1" symbol of said local sequence with N samples of first occurrence from said A/D converter means and multiplying said "−1" symbol of said local sequence with N samples of subsequent occurrence from said A/D converter means to produce an output sequence; and means for estimating said carrier frequency and an initial phase of the burst signal form said output sequence.

11. A burst demodulator as claimed in claim 9, wherein said burst detector means comprises:

preamble generator means for generating a local sequence of alternating "1" and "−1" symbols;

multiplier means for multiplying said "1" symbol of said local sequence with N samples of first occurrence from said A/D converter means and multiplying said "−1" symbol of said local sequence with N samples of subsequent occurrence from said A/D converter means to produce an output sequence;

sampler means for splitting said output sequence of said multiplier means into a sequence of odd-numbered samples and a sequence of even-numbered samples;

first low-pass filter means for low-pass filtering said odd-numbered samples;

first envelope detector means for detecting a root-sum-square value of an output signal of said second low-pass filter means;

third low-pass filter means for low-pass filtering an output signal of said first envelope detector means;

fourth low-pass filter means for low-pass filtering an output signal of said second envelope detector means;

third envelope detector means for detecting a combined root-sum-square value of output signals of said third and fourth low-pass filter means; and comparator means for detecting when said combined root-sum-square value exceeds a predetermined threshold value to generate a signal indicating the arrival of a burst signal.

12. A burst demodulator as claimed in claim 9, wherein said clock recovery means comprises:

envelope detector means for detecting a root-sum-square value of delayed samples of said first sequence;

orthogonal detector means for generating products of said root-sum-square value and phase values of a sine wave and products of said root-sum-square value and phase values of a cosine wave;

low-pass filter means for low-pass filtering said products and generating estimated symbol timing; and arctangent calculator means for detecting the phase angle of said estimated symbol timing from the low-pass filtered products in response to the detection of arrival of a burst signal by said burst detector means.

13. A burst demodulator as claimed in claim 9, wherein said clock recovery means comprises:
envelope detector means for detecting a root-sum-square value of the digital samples from said A/D converter means;
sampler means for splitting an output signal of said envelope detector means into first, second, third and fourth sequences of samples;
first subtractor means for subtracting said third sequence from said first sequence and second subtractor means for subtracting said fourth sequence from said second sequence;
first and second low-pass filter means for low-pass filtering outputs of said first and second subtractor means, respectively; and
arctangent calculator means for detecting the phase angle of said estimated symbol timing from outputs of the first and second low-pass filter means in response to the detection of arrival of a burst signal by said burst detector means.

14. A burst demodulator as claimed in claim 9, wherein said carrier recovery means comprises:
preamble generator means for generating a local sequence of alternating "1" and "−1" symbols in response to the clock timing estimated by said clock recovery means;
multiplier means for alternately multiplying said "1" and "−1" symbols of said local sequence with successive samples from said A/D converter means to extract the carrier component of said received burst signal;
complex Fourier transform means for transforming the extracted carrier component to a frequency domain complex signal;
frequency and phase estimating means for estimating the frequency and phase of a carrier to be recovered from the frequency domain complex signal; and
numeric controlled oscillator means for generating a carrier in response to the estimated frequency and phase.

15. A burst demodulator as claimed in claim 9, further comprising second memory means coupled to said sampler means for storing the digital samples extracted by the sampler means, and wherein said complex multiplier means is responsive to the estimation of the carrier frequency and the initial phase by said carrier recovery means for reading digital samples from the second memory means.

16. A burst demodulator as claimed in claim 9, further comprising a phase-locked loop connected between input and output of said complex multiplier means for continuously generating from an output signal of the complex multiplier means a subsequent complex carrier signal immediately following the estimation of said carrier frequency and the initial phase of said burst signal by said carrier recovery means and for supplying said subsequent complex carrier signal to said complex multiplier means instead of the complex carrier signal from said carrier recovery means.

17. In a burst demodulator which comprises orthogonal detector means for receiving an amplitude-phase shift keyed (APSK) burst signal having a carrier frequency and a phase associated therewith and containing a preamble formed by a sequence of alternating "1" and "−1" symbols, and a data field, and for quasi-coherently demodulating the received burst signal into a baseband complex signal, and analog-to-digital (A/D) converter means for converting the baseband complex signal to digital form so that each symbol of the complex signal yields N binary-coded digital samples, the integer N being such that at least one of the N digital samples is closest to a signal point of the received burst signal, a burst detector comprising:
preamble generator means for generating a local sequence of alternating "1" and "−1" symbols;
multiplier means for multiplying said "1" symbols of said local sequence with N samples of first occurrence from said A/D converter means and multiplying said "−1" symbol of said local sequence with N samples of subsequent occurrence from said A/D converter means to produce an output sequence;
sampler means for splitting said output sequence of said multiplier means into a sequence of odd-numbered samples and a sequence of even-numbered samples;
first low-pass filter means for low-pass filtering said odd-numbered samples;
second low-pass filter means for low-pass filtering said even numbered samples;
first envelope detector means for detecting a root-sum-square value of an output signal of said first low-pass filter means;
second envelope detector means for detecting a root-sum-square value of an output signal of said second low-pass filter means;
third low-pass filter means for low-pass filtering an output signal of said first envelope detector means;
fourth low-pass filter means for low-pass filtering an output signal of said second envelope detector means;
third envelope detector means for detecting a combined root-sum-square value of output signals of said third and fourth low-pass filter means; and
comparator means for detecting when said combined root-sum-square value exceeds a predetermined threshold value to generate a signal indicating the arrival of a burst signal.

* * * * *